(12) United States Patent
Heinzelmann

(10) Patent No.: US 6,726,110 B2
(45) Date of Patent: Apr. 27, 2004

(54) THERMOSTATICALLY CONTROLLED MIXING VALVE

(75) Inventor: Werner Heinzelmann, Alpirsbach (DE)

(73) Assignee: Hansgrohe AG, Schiltach (DE)

( * ) Notice: Subject to any disclaimer, the term of this patent is extended or adjusted under 35 U.S.C. 154(b) by 0 days.

(21) Appl. No.: 10/104,088

(22) Filed: Mar. 21, 2002

(65) Prior Publication Data
US 2002/0134848 A1 Sep. 26, 2002

(30) Foreign Application Priority Data
Mar. 22, 2001 (DE) .......................... 101 14 357

(51) Int. Cl.⁷ .................... G05D 23/12; G05D 23/13
(52) U.S. Cl. .................... 236/12.19; 236/100
(58) Field of Search ............. 236/12.2, 12.19, 236/12.17, 12.1, 12.12; 137/41

(56) References Cited

U.S. PATENT DOCUMENTS

| | | | | |
|---|---|---|---|---|
| 3,685,728 A | * | 8/1972 | Chapou | 236/12.2 |
| 4,165,034 A | * | 8/1979 | Rogers, Jr. et al. | 236/12.2 |
| 4,610,393 A | * | 9/1986 | Rodriguez | 236/12.15 |
| 4,760,953 A | | 8/1988 | Trubert | |
| 5,011,074 A | * | 4/1991 | Kline | 236/12.13 |
| 5,111,846 A | * | 5/1992 | Hochstrasser et al. | 137/607 |
| 5,148,976 A | * | 9/1992 | Reid | 236/12.2 |
| 5,323,960 A | * | 6/1994 | Kline | 236/12.2 |
| 5,433,378 A | * | 7/1995 | Orlandi | 236/12.2 |
| 5,791,557 A | * | 8/1998 | Kunze | 236/34.5 |
| 5,860,591 A | * | 1/1999 | Gylov et al. | 236/42 |
| 5,927,597 A | | 7/1999 | Bolágar et al. | |
| 5,934,552 A | * | 8/1999 | Kalbacher et al. | 236/12.2 |
| 5,979,777 A | * | 11/1999 | Ems | 236/12.2 |
| 5,988,514 A | * | 11/1999 | Huang | 236/12.14 |
| 6,079,625 A | * | 6/2000 | Lebkuchner | 236/12.2 |
| 6,089,462 A | * | 7/2000 | Osvaldo | 236/12.2 |

FOREIGN PATENT DOCUMENTS

| | | | | |
|---|---|---|---|---|
| DE | 3239772 | | 5/1984 | |
| EP | WO 89/01585 | * | 2/1989 | F16K/47/02 |
| EP | 0 356 404 | * | 2/1990 | F16K/11/00 |
| EP | 0 560 737 A2 | * | 9/1993 | G05D/23/13 |
| EP | 0 775 954 A1 | * | 5/1997 | G05D/23/13 |
| GB | 2 275 097 | * | 8/1994 | G05D/23/13 |
| WO | WO 93 02 308 A1 | | 2/1993 | F16K/11/044 |

\* cited by examiner

Primary Examiner—William E. Tapolcai
Assistant Examiner—Mohammad M. Ali
(74) Attorney, Agent, or Firm—Duane Morris LLP

(57) ABSTRACT

A thermostatic mixing valve contains a control bush, which can be displaced by an expansion element, which is exposed to the mixing water temperature. As a function of the mixing water temperature and the set desired temperature, the control bush is displaced for simultaneously opening the hot water supply and closing the cold water supply or vice versa. According to the invention there are two control openings for the cold water and two control openings for the hot water.

17 Claims, 3 Drawing Sheets

THERMOSTATICALLY CONTROLLED MIXING VALVE

Figure 1:
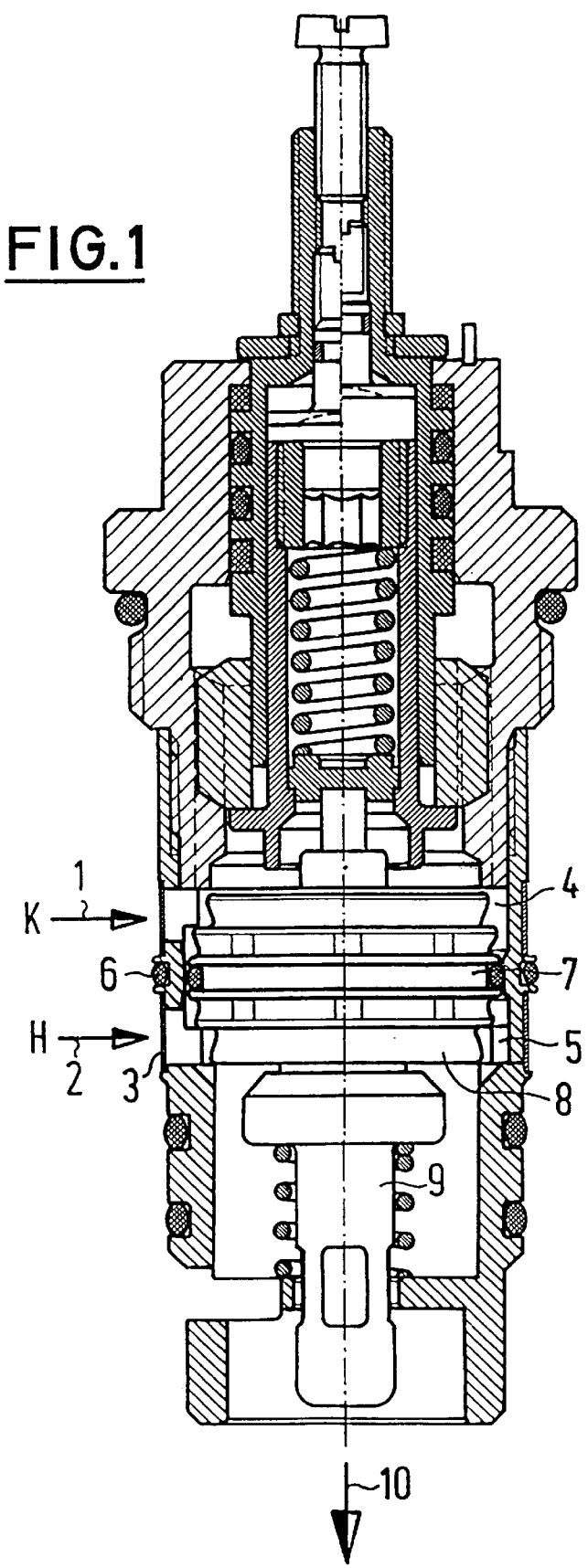

The invention is directed at a thermostatically controlled mixing valve. Mixing valves of this type have one inlet for cold water and another inlet for hot water. The mixing ratio between the hot water and the cold water is obtained by a valve body in the form of a control bush placed in a control sleeve. The mixing water temperature is exposed to an expansion element moved axially in the control bush. During movement it changes the ratio of hot to cold water.

As a result of the space available and the standard temperatures, as well as the material used for the expansion element, the width of the slot between the control bush and the associated valve seat is approximately 0.4 to 0.8 mm. Thus, if a specific flow cross-section is required, this leads to a relatively large control bush diameter derived therefrom.

The problem of the invention is to provide a thermostatically controlled mixing valve, which permits large flow cross-sections of the control openings with a very limited space requirement.

Thus, the mixing valve proposed by the invention uses a valve body having, at least on one side, at least two control openings for the inflowing water. On the other side, i.e. the side with the higher or lower temperature, the invention provides for at least one control opening, but preferably also two control openings.

The measures of the invention make it possible to in each case open or close two control openings with the same stroke or travel. This makes it possible to double the flow cross-section of the control openings in the opened state. When there are more than two control openings on each side, the flow cross-section can be further increased. This increase in the flow cross-section for an unchanged stroke quantity can be utilized for reducing the valve body diameter and therefore the fitting size. It can be adequate for there to be two control openings only on one side of the valve, e.g. the hot water side. However, it is particularly favourable if there are at least two control openings on both sides of the valve.

According to a further development of the invention, each control opening is formed by a movable portion of the valve body and a non-movable part of the mixing valve, particularly by part of the casing.

According to a further development of the invention, at least one control opening is formed between a slot of the valve body and an edge of the mixing valve casing. Through the displacement of the slot with respect to the casing edge, it is possible to increase or decrease the flow cross-section of the control openings.

It is also possible and is proposed by the invention that at least one control opening is formed between two control faces, the valve body movement direction being roughly perpendicular to at least one control face.

According to another further development of the invention, on the casing is placed a valve seat, which together with the valve body forms a control opening.

Also in the case of the thermostatically controlled mixing valve proposed by the invention, a control bush can be used as the valve body.

According to the invention, at least one end face of the valve body cooperates with a control face forming a valve seat for forming a control opening.

It is possible for at least two control openings to be spaced from one another in the valve body movement direction. Particularly if the valve body is moved axially, this ensures that the inflowing water can penetrate over a relatively large area in the axial direction.

According to a further development of the invention, at least one control face has an elastic surface. As the control openings are closed simultaneously, this can be used for compensating tolerances resulting from manufacture. The elastic surface can be formed by an insert or support of an elastic material, particularly an elastomeric material. At least one seat can be sprung.

Further features, details and advantages of the invention can be gathered from the following description of preferred embodiments, the claims, whose wording is by reference made into content of the description, and the attached drawings, wherein show:

FIG. 1 A valve insert provided with a thermostat.

Figure 2:
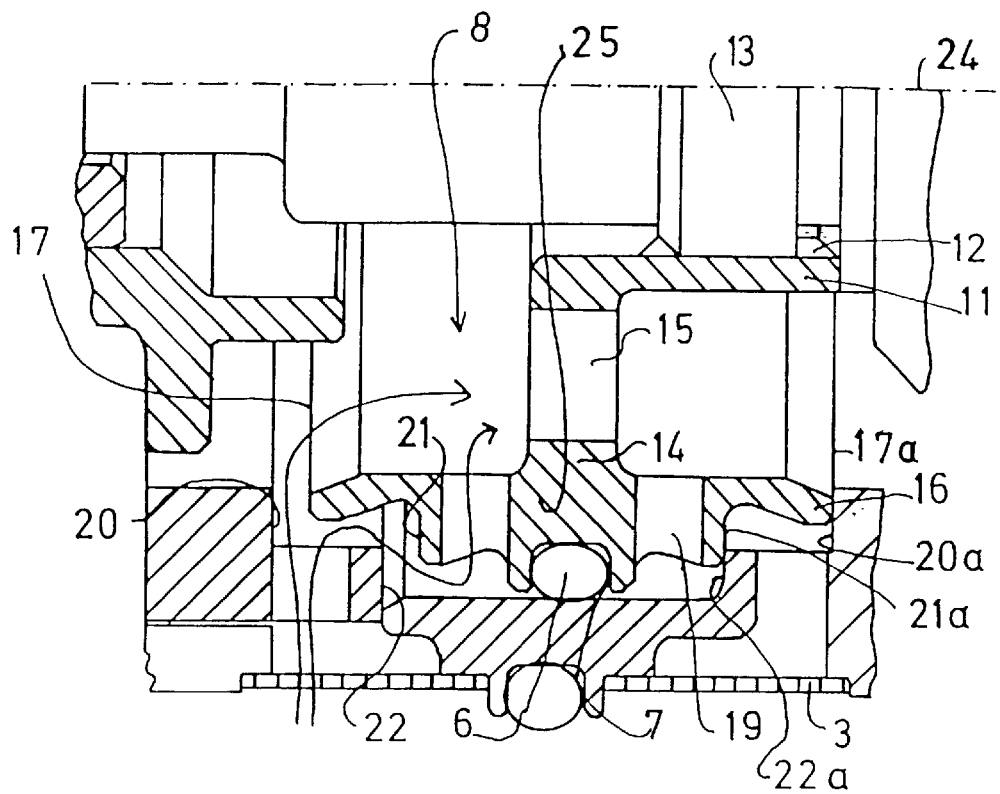

FIG. 2 On a larger scale a detail of the thermostatic valve.

Figure 3:
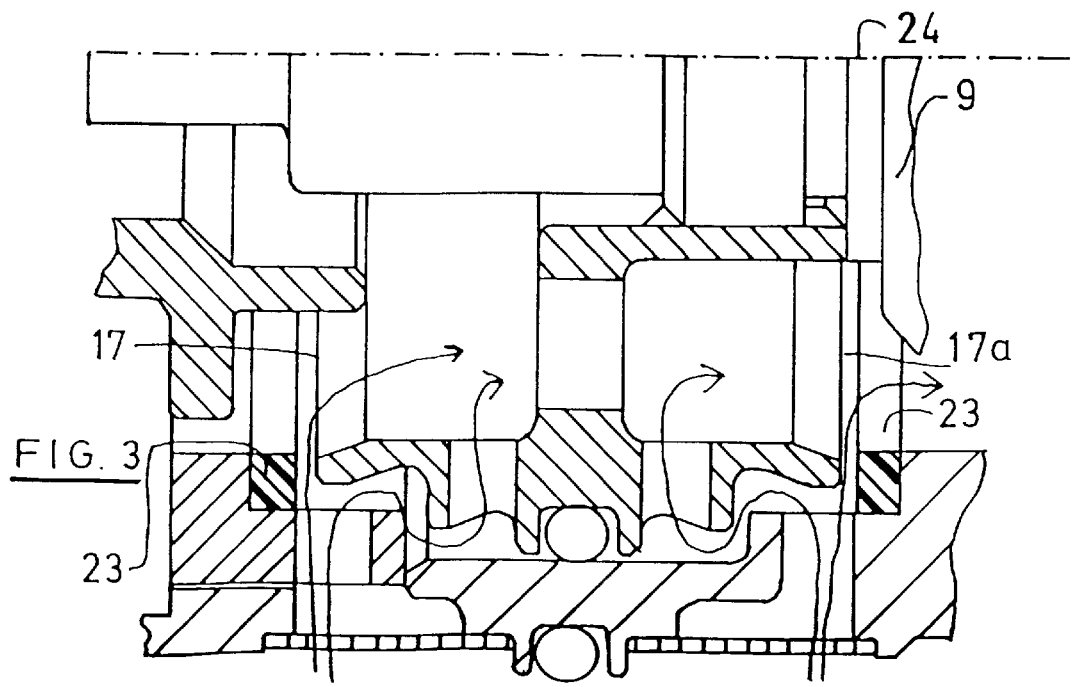

FIG. 3 A detail corresponding to FIG. 2, in a modified embodiment.

Figure 4:
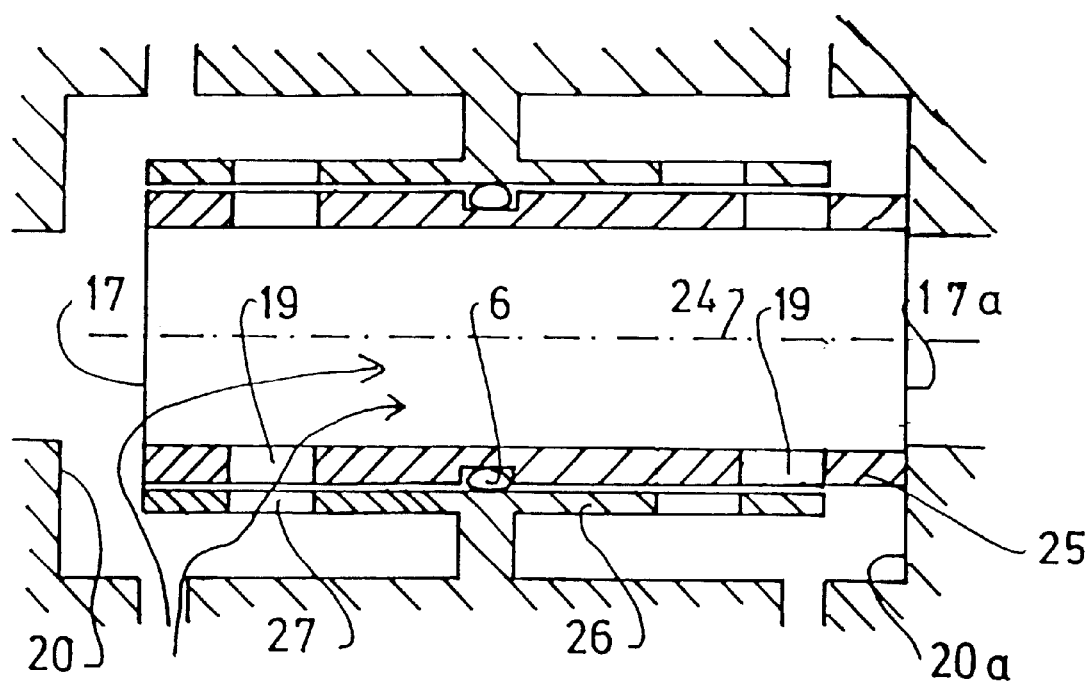

FIG. 4 In greatly simplified form the arrangement with another embodiment.

In axial section FIG. 1 shows the structure of a valve insert with a thermostatically controlled mixing valve. The structure essentially corresponds to that of conventional thermostatic valves. There is an inlet 1 for cold water and an inlet 2 for hot water, both inlets being secured by a screen or sieve 3. The hot and cold water in each case pass into an annular space 4, 5 sealed against one another by a seal 6. The seal 6 is seated in a circumferential groove 7 of a valve body 8, which is mechanically connected to an expansion element 9, which can axially displace the valve body 8, as a function of the temperature of the expansion element 9. The expansion element 9 is positioned in such a way that it is exposed to the mixing water temperature. The mixing water leaves the valve in the direction of the arrow 10.

The function of the invention will now be described with the aid of FIG. 2. The valve body 8 is constructed as a control bush. In the centre it has a cylindrical portion 11, into whose internal thread 12 is screwed a piston 13 movable by the expansion element. As a result the control bush is axially concomitantly moved during the axial movement of the piston 13. The cylindrical portion 11 is located on a disk 14, which has axial orifices 15. The outer portion 16 of the control bush contains two front edges 17, 17a. Between the front edges 17, 17a and the centrally positioned disk 14 is provided a row of radial orifices 19 extending circumferentially over a specific arc. Roughly centrally on the outside of the control bush is provided the aforementioned circumferential groove 7 with the seal 6 placed therein.

Facing each front edge 17, 17a is formed an annular face 20, 20a, which is located in one plane. Together with the particular front edge 17, 17a of the control bush, said annular faces 20, 20a define a control opening shaped like a circumferential slot. If the control bush is moved to the left in FIG. 2, there is a reduction to the width of the slot between the annular face 20 and the front edge 17, whereas on the opposite side there is an increase in the spacing between the annular face 20a and the front edge 17a. The annular face 20, 20a, on which engages the front edge 17 or 17a, forms a valve seat.

In the axial direction between the two front edges 17, 17a of the control bush and the orifices 19, there is an outwardly directed face 21, 21a at right angles to the axial direction and which also forms an annular face. Facing said annular faces are provided valve seat faces 22, 22a, which together with the annular faces 21 form a further control opening on each side of the valve. The axial spacing between the annular faces 20 and the associated front edges 17 and 17a corresponds precisely to the axial spacing between the valve seat faces 22, 22a and the annular faces 21, 21a. Thus, to the right in FIG. 2, there is an abutment of both the front edge 17a on face 20a and of face 21a on face 22a. To the left in FIG. 2 the water can flow in the direction of the arrows into the interior of the control bush and from there, to the right into the space in which the expansion element 9 is located.

As has already been stated, for a correct function of the valve the spacing between the front edge 17 and the associated valve seat face 20 must be the same as the spacing between the corresponding faces 21, 22. In order to be able to compensate tolerances resulting from manufacture or, in other words, to make it possible to live with these tolerances, the invention now proposes that the two valve seat faces 20, 20a, which cooperate with the front edges 17, 17a, be provided with a resilient surface. In the embodiment of FIG. 3 this is brought about in that an elastomeric material ring 23 is inserted in a corresponding indentation. As two control openings are opened and closed on each side of the valve body, i.e. on the hot and cold sides, it is appropriate to place such a ring 23 only on one valve seat face. If there were three control openings on each side, use would be made of such elastomeric material rings 23 for two valve seat faces.

Reference is now made to the highly simplified representation of the embodiment of FIG. 4. Once again only half of the arrangement is shown, namely that below the longitudinal axis. For simplification purposes the control bush 25 is shown as a sleeve, which once again has two front edges 17, 17a and radial orifices 19. Facing and externally embracing the control bush 25 is provided a cylindrical casing wall, which also has radial orifices 27. To the left in FIG. 4 coincidence exists between the orifices 19 of the control bush and the orifices 27 of the casing. Thus, the water can flow in the direction of the arrows around the front edge 17 of the control bush 25 and also through the coinciding radial slots 19, 27 into the interior of the control bush 25, from where the water passes to the outlet, cf. arrow 10 in FIG. 1. On the right-hand side of FIG. 4 the control opening formed between the front edge 17a and the casing is closed, as is the second control opening formed by the orifices 19, 27. If the control bush 25 is now moved to the left, simultaneously the two control openings on the left-hand side close, whereas those on the right-hand side open. Without increasing the stroke a doubling of the flow cross-section of the control openings is obtained. What is represented diagrammatically in FIG. 4 for two control openings on each side of the valve, can also be represented and implemented for several control openings.

What is claimed is:

1. Thermostatically controlled mixing valve for a sanitary fitting, having an expansion element exposed to a mixing water temperature and a valve body movable by the expansion element and which during movement of the valve body controls at least two control openings for at least one of an inflowing cold water having said at least two control openings, and an inflowing hot water having said at least two control openings, wherein said at least two control openings for said at least one of the inflowing cold water and the inflowing hot water, affect the mixing water temperature; and, wherein at least one of said control openings is formed between two control faces brought toward one another by movement of the valve body in a movement direction substantially perpendicular to at least one of said control faces.

2. Mixing valve according to claim 1, wherein each of said control openings is formed at least partly by a movable portion of the valve body.

3. Mixing valve according to claim 1, wherein at least one of said control openings is formed between a slot of the valve body and an edge of a casing of the mixing valve.

4. Mixing valve according to claim 1, wherein at least one of said control openings is formed between a valve seat defined by a casing of the mixing valve, and the valve body.

5. Mixing valve according to claim 1, wherein the valve body comprises a control bush.

6. Mixing valve according to claim 1, wherein at least one front face of the valve body cooperates with a valve seat formed by one of a face and an edge for forming at least one said control opening.

7. Mixing valve according to claim 1, wherein said at least two control openings are spaced from one another in a movement direction of the valve body.

8. Mixing valve according to claim 1, wherein the valve body cooperates with at least one valve seat formed by an annular face of a casing of the mixing valve.

9. Mixing valve according to claim 1, wherein said at least two control openings are spaced from one another in a direction at right angles to a movement direction of the valve body.

10. Mixing valve according to claim 1, wherein at least one control face has an elastic surface for bearing against the valve body.

11. Mixing valve according to claim 10, wherein the elastic surface is formed from elastic material.

12. Mixing valve according to claim 1, wherein at least one said control face is movably mounted.

13. Mixing valve according to claim 1, wherein at least one said control face is spring-mounted.

14. Mixing valve according to claim 1, wherein at least one said control opening is formed at least partly between a movable portion of the valve body and a non-movable part of the mixing valve.

15. Mixing valve according to claim 14, wherein at least one said control opening is formed between a movable portion of the valve body and a casing.

16. Mixing valve according to claim 1, wherein the valve body cooperates with at least one valve seat formed by a planar annular face of a casing of the mixing valve.

17. Mixing valve according to claim 10, wherein the elastic surface is formed by an elastomeric material for supporting the valve body.

* * * * *